United States Patent
Steinborn et al.

(10) Patent No.: US 12,128,903 B2
(45) Date of Patent: Oct. 29, 2024

(54) METHOD AND CONTROL DEVICE FOR OPERATING A DRIVE TRAIN

(71) Applicant: ZF Friedrichshafen AG, Friedrichshafen (DE)

(72) Inventors: Mario Steinborn, Friedrichshafen (DE); Maik Würthner, Markdorf (DE); Thea Schlueter, Friedrichshafen (DE); Frieder Norrenberg, Argenbühl (DE); Martin Fajfr, Štěnovice (CZ)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/573,639

(22) PCT Filed: Jun. 21, 2022

(86) PCT No.: PCT/EP2022/066785
§ 371 (c)(1),
(2) Date: Dec. 22, 2023

(87) PCT Pub. No.: WO2022/268750
PCT Pub. Date: Dec. 29, 2022

(65) Prior Publication Data
US 2024/0300497 A1 Sep. 12, 2024

(30) Foreign Application Priority Data
Jun. 24, 2021 (DE) ...................... 10 2021 206 547.3

(51) Int. Cl.
*B60W 30/19* (2012.01)
*B60W 10/02* (2006.01)
(Continued)

(52) U.S. Cl.
CPC ............ *B60W 30/19* (2013.01); *B60W 10/02* (2013.01); *B60W 10/04* (2013.01);
(Continued)

(58) Field of Classification Search
CPC ...... F16H 61/0403; F16H 61/70; F16H 61/16; F16H 2061/0411; F16H 2061/161;
(Continued)

(56) References Cited

U.S. PATENT DOCUMENTS

| 1,926,783 A | 9/1933 | Miller |
| 4,514,811 A | 4/1985 | Daubenmier et al. |

(Continued)

FOREIGN PATENT DOCUMENTS

| DE | 198 23 764 A1 | 12/1998 |
| DE | 199 04 129 C1 | 2/2000 |

(Continued)

OTHER PUBLICATIONS

German Patent Office, Office Action issued in German patent application No. 10 2021 206 547.3 (Feb. 24, 2022).
(Continued)

*Primary Examiner* — Timothy Hannon
(74) *Attorney, Agent, or Firm* — Finch & Maloney PLLC

(57) ABSTRACT

A method for operating a drive train of a motor vehicle, where the drive train includes a drive aggregate, a group transmission connected between the drive aggregate and a drive output, and a separating cutch connected between the drive aggregate and the group transmission. If a speed is lower than a limit value, the separating clutch is opened and for transmission preselection one or all the other sub-transmission(s) is/are changed to a friction-force-locking condition. The separating clutch is then at least partially closed and the drive aggregate is brought to a defined rotation speed. When a friction-force-locking group transmission is required, it is checked whether a starting gearshift or a driver-desired shift for the group transmission is called for and the target rotation speed of the drive aggregate is checked. Depending on the results, the sub-transmission can
(Continued)

be synchronized by a transmission brake or by the drive aggregate.

18 Claims, 2 Drawing Sheets

(51) Int. Cl.
| | | |
|---|---|---|
| *B60W 10/04* | (2006.01) | |
| *B60W 10/111* | (2012.01) | |
| *F16H 59/18* | (2006.01) | |
| *F16H 59/42* | (2006.01) | |
| *F16H 59/44* | (2006.01) | |
| *F16H 59/54* | (2006.01) | |
| *F16H 61/04* | (2006.01) | |
| *F16H 61/16* | (2006.01) | |
| *F16H 61/70* | (2006.01) | |
| *F16H 59/52* | (2006.01) | |
| *F16H 59/66* | (2006.01) | |

(52) U.S. Cl.
CPC ........... *B60W 10/111* (2013.01); *F16H 59/18* (2013.01); *F16H 59/42* (2013.01); *F16H 59/44* (2013.01); *F16H 59/54* (2013.01); *F16H 61/0403* (2013.01); *F16H 61/16* (2013.01); *F16H 61/70* (2013.01); *B60W 2510/0638* (2013.01); *B60W 2510/104* (2013.01); *B60W 2710/021* (2013.01); *B60W 2710/1005* (2013.01); *F16H 59/52* (2013.01); *F16H 2059/663* (2013.01); *F16H 2061/0411* (2013.01); *F16H 2061/161* (2013.01); *F16H 2200/0039* (2013.01)

(58) Field of Classification Search
CPC .......... F16H 59/18; F16H 59/42; F16H 59/44; F16H 59/54; F16H 59/52; F16H 2059/663; F16H 2059/366; B60W 30/19; B60W 10/02; B60W 10/04; B60W 10/111; B60W 2510/0638; B60W 2510/104; B60W 2710/021; B60W 2710/1005
See application file for complete search history.

(56) References Cited

U.S. PATENT DOCUMENTS

| | | | |
|---|---|---|---|
| 4,911,275 A | 3/1990 | Ohkumo et al. | |
| 5,441,463 A | 8/1995 | Steeby | |
| 5,875,409 A | 2/1999 | Steeby et al. | |
| 5,941,925 A | 8/1999 | Hess et al. | |
| 5,984,828 A | 11/1999 | Huber | |
| 6,044,721 A | 4/2000 | Genise | |
| 6,497,635 B2 | 12/2002 | Suzuki | |
| 6,507,780 B2 | 1/2003 | Graf | |
| 6,770,010 B2 | 8/2004 | Matsumura et al. | |
| 6,881,171 B2 | 4/2005 | Kuhstrebe et al. | |
| 6,939,265 B2 | 9/2005 | Rustige et al. | |
| 7,134,355 B2 | 11/2006 | Eriksson et al. | |
| 7,223,204 B2 | 5/2007 | Steen et al. | |
| 7,344,474 B2 | 3/2008 | Stasik et al. | |
| 7,662,063 B2 | 2/2010 | Schnitzer | |
| 7,862,470 B2 | 1/2011 | Eguchi et al. | |
| 7,935,024 B2 | 5/2011 | Winkel et al. | |
| 7,976,431 B2 | 7/2011 | Bader et al. | |
| 8,066,617 B2* | 11/2011 | Steeborn ............ | F16H 61/702 477/49 |
| 8,192,327 B2 | 6/2012 | Gibson et al. | |
| 8,200,402 B2 | 6/2012 | Doebele et al. | |
| 8,332,120 B2 | 12/2012 | Bjernetun et al. | |
| 8,521,379 B2 | 8/2013 | Wurthner et al. | |
| 8,663,067 B2 | 3/2014 | Mair et al. | |
| 8,870,712 B2* | 10/2014 | Steinborn ............ | B60W 10/04 477/77 |
| 8,915,160 B2* | 12/2014 | Guggolz ............. | F16H 61/0403 74/335 |
| 8,979,707 B2 | 3/2015 | Kemler et al. | |
| 10,508,724 B2* | 12/2019 | Steinborn ............ | F16H 61/702 |
| 10,648,555 B2* | 5/2020 | Rist ..................... | F16H 61/0403 |
| 10,654,480 B2 | 5/2020 | Kagerer et al. | |
| 11,279,359 B2 | 3/2022 | Plianos et al. | |
| 11,292,472 B2* | 4/2022 | Steinborn ............ | F16H 61/702 |
| 2001/0011484 A1 | 8/2001 | Ruhle et al. | |
| 2001/0023385 A1 | 9/2001 | Nishimura et al. | |
| 2004/0228946 A1 | 11/2004 | Yokoyama et al. | |
| 2005/0096181 A1 | 5/2005 | DeVore et al. | |
| 2006/0160661 A1 | 7/2006 | Stasik et al. | |
| 2006/0211536 A1 | 9/2006 | Guggolz et al. | |
| 2006/0240943 A1 | 10/2006 | Winkel et al. | |
| 2008/0243349 A1 | 10/2008 | Trautenberg | |
| 2010/0285922 A1 | 11/2010 | Breuer et al. | |
| 2010/0286884 A1 | 11/2010 | Bunn | |

FOREIGN PATENT DOCUMENTS

| | | |
|---|---|---|
| DE | 103 61 299 A1 | 7/2005 |
| DE | 10 2004 017 115 A1 | 10/2005 |
| DE | 10 2004 038 520 A1 | 2/2006 |
| DE | 10 2005 049 198 A1 | 4/2007 |
| DE | 10 2007 006 501 A1 | 8/2008 |
| DE | 10 2007 036 794 A1 | 2/2009 |
| DE | 10 2008 023 135 A1 | 11/2009 |
| DE | 10 2011 005 320 A1 | 9/2012 |
| DE | 10 2011 088 833 A1 | 6/2013 |
| DE | 10 2014 016 932 A1 | 5/2015 |
| DE | 10 2014 012 984 A1 | 3/2016 |
| DE | 10 2018 000 734 A1 | 8/2018 |
| DE | 10 2017 204 224 A1 | 9/2018 |
| EP | 0 427 000 A2 | 10/1990 |
| EP | 1 316 463 A2 | 6/2003 |
| EP | 1 923 291 A2 | 5/2008 |
| WO | 02/06015 A1 | 8/2002 |
| WO | 2004/037590 A1 | 5/2004 |
| WO | 2008/107318 A1 | 9/2008 |

OTHER PUBLICATIONS

European Patent Office, International Search Report issued in International patent application No. PCT/EP2022/066785 (Oct. 14, 2022).
European Patent Office, Written Opinion issued in International patent application No. PCT/EP2022/066785 (Oct. 14, 2022).
German Patent Office, Office Action issued in German patent application No. 10 2021 206 546.5 (Mar. 22, 2022).
European Patent Office, International Search Report issued in International patent application No. PCT/EP2022/066784 (Sep. 23, 2022).
European Patent Office, Written Opinion issued in International patent application No. PCT/EP2022/066784 (Sep. 23, 2022).
German Patent Office, Office Action issued in German patent application No. 10 2021 206 541.4 (Jan. 14, 2022).
European Patent Office, International Search Report issued in International patent application No. PCT/EP2022/066782 (Sep. 15, 2022).
European Patent Office, Written Opinion issued in International patent application No. PCT/EP2022/066782 (Sep. 15, 2022).

* cited by examiner

METHOD AND CONTROL DEVICE FOR OPERATING A DRIVE TRAIN

RELATED APPLICATIONS

This application claims the benefit under 35 U.S.C. § 371 as a U.S. National Phase Application of application no. PCT/EP2022/066785, filed on 21 Jun. 2022, which claims the benefit of German Patent Application no. 10 2021 206 547.3 filed 24 Jun. 2021, the contents of which are hereby incorporated herein by reference in their entireties.

FIELD OF THE DISCLOSURE

The invention relates to a method for operating a drive train of a motor vehicle, wherein the drive train comprises a drive aggregate, a group transmission connected between the drive aggregate and a drive output, and a separating clutch connected between the drive aggregate and the group transmission, wherein the group transmission comprises a plurality of sub-transmissions, namely at least one main transmission and, in addition, a splitter group drivingly connected upstream from the main transmission and/or a range group drivingly connected downstream from the main transmission. Furthermore, the invention relates to a control unit for operating a drive train of that type.

BACKGROUND

From the prior art drive trains of motor vehicles are known, which have a group transmission as their transmission. A group transmission comprises a main transmission, a splitter group drivingly connected upstream from the main transmission and/or a range group drivingly connected downstream from the main transmission. The main transmission is also called the main group. DE 10 2007 007 257 A1 discloses that in shifting processes in a group transmission an electric machine can be used as synchronization means.

When a motor vehicle with a group transmission decelerates, i.e., moves progressively more slowly, then when the speed of the motor vehicle falls below a certain threshold, the separating clutch opens, and the drive aggregate is therefore decoupled from the transmission. If from such a condition the group transmission has to be changed to a friction-force-locking state for carrying out in the group transmission either a starting gearshift or a shift desired by the driver, then in some circumstances the synchronization times can be quite long and the changing of the group transmission to a friction-force-locking state can take a very long time since, when the separating clutch is open and in the case of a non-friction-force-locking group transmission, an input shaft of the group transmission can slow down. Long synchronization times for the group transmission have an adverse effect on comfort.

There is therefore a need to synchronize group transmissions more quickly and thus to change a group transmission more quickly from a non-friction-force-locking condition to a friction-force-locking condition.

DE 10 2007 012 875 A1 discloses a method for operating a drive train, in which when the motor vehicle is coasting with its starting clutch open, a gear suitable for the current speed of the motor vehicle is engaged so that when the starting clutch is subsequently closed, a gear appropriate for the actual speed of the motor vehicle is in place.

DE 10 2007 010 295 A1 discloses a further method for operating a drive train of a motor vehicle, namely, to carry out so-termed push-downshifts during coasting operation of the motor vehicle.

SUMMARY

Starting from there, the purpose of the present invention is to provide a new type of method for operating a drive train of a motor vehicle, and a control unit for carrying out the method.

This objective is achieved by a method for operating a drive train according to the present disclosure.

When the speed of the motor vehicle is slower than a threshold value, the separating clutch is opened and for transmission preselection one of the sub-transmissions is changed to neutral or in the direction of neutral and the other sub-transmission or all the other sub-transmissions are changed to a friction-force-locking condition or in the direction of a friction-force-locking condition.

Thereafter, the separating clutch is at least partially closed and the drive aggregate is brought to a defined rotation speed.

Then, it is checked whether when a friction-force-locking group transmission is required, a starting gearshift or a gearshift desired by the driver is called for.

If a gearshift is desired by a driver, it is checked whether a target rotation speed of the drive aggregate is faster or slower than the current input rotation speed of the group transmission.

If a starting gearshift is required, and if, when a driver calls for a gearshift the target rotation speed of the drive aggregate is lower than the current input rotation speed to the group transmission, then the separating clutch is opened and the sub-transmission that is in neutral is synchronized by means of a transmission brake and after the synchronization of the sub-transmission it is changed to a friction-force-locking condition. Then, if the driver has called for a gearshift and the rotation speed of the drive aggregate is higher than the current input rotation speed to the group transmission, the sub-transmission that is in neutral is synchronized by the drive aggregate and after the synchronization of the sub-transmission it is changed to a friction-force-locking condition.

With the method according to the invention it is proposed, in contrast, that if a speed of the motor vehicle is lower than a limit value, when the separating clutch is open and if one of the sub-transmissions of the group transmission is changed to neutral or in the direction toward neutral, the other or every other sub-transmission of the group transmission is changed into a friction-force-locking condition or in the direction toward a friction-force-locking condition, the separation clutch is at least partially closed and the drive aggregate is brought to a defined rotation speed and then it is checked whether the group transmission should be changed to a friction-force-locking condition to carry out a starting shift or to carry out a gearshift desired by the driver. Depending on that, a defined synchronization of the sub-transmission of the group transmission that is in neutral takes place and thereafter the sub-transmission, and therefore the group transmission as a whole, is changed to a friction-force-locking condition. With the invention it is possible to reduce the time required for changing a group transmission from a non-friction-force-locking condition to a friction-force-locking condition. In the case of starting gearshifts from a standstill of the motor vehicle, tooth-on-tooth positions at the shifting elements of the group transmission can be prevented.

Preferably, to check whether when a friction-force-locking group transmission is called for a starting gearshift has been requested, it is checked whether a current speed of the motor vehicle is lower than a second limit value, and if indeed the current speed of the motor vehicle is lower than the second limit value, a starting gearshift is called for. Preferably, to check whether when a friction-force-locking group transmission is required and a gearshift desired by the driver has been called for, then in addition to the speed of the motor vehicle the driver's actuation of the accelerator pedal and/or of the brake pedal is checked, and if the current speed of the motor vehicle is higher than the second limit value and if, furthermore, a brake pedal is no longer being actuated by the driver and/or an accelerator pedal is actuated by the driver, then a driver-desired gearshift is called for. This procedure is particularly suitable for checking whether, to carry out a starting gearshift or a gearshift desired by the driver, the group transmission should be changed to a friction-force-locking condition.

Preferably, when a gearshift is called for by a driver, then depending on the operating conditions of the motor vehicle at the time, a target gear for the group transmission, and as a function of that target gear the target rotation speed of the drive aggregate, are determined. After determining the target gear, it is checked whether the transmission preselection is not appropriate for the target gear, and if it is found that the transmission preselection is not appropriate for the target gear the method is discontinued, but if it is found that the transmission preselection is appropriate for the target gear, the method is not discontinued. In that way the method can be improved further.

The control unit according to the invention is also disclosed herein.

BRIEF DESCRIPTION OF THE DRAWINGS

Preferred further developments emerge from the subordinate claims and from the description given below. Example embodiments of the invention, to which it is not limited, are explained in greater detail with reference to the drawing, which shows:

DETAILED DESCRIPTION

The present invention relates to a method for processing a drive train of a motor vehicle, and to a control unit for carrying out the method.

Figure 1:
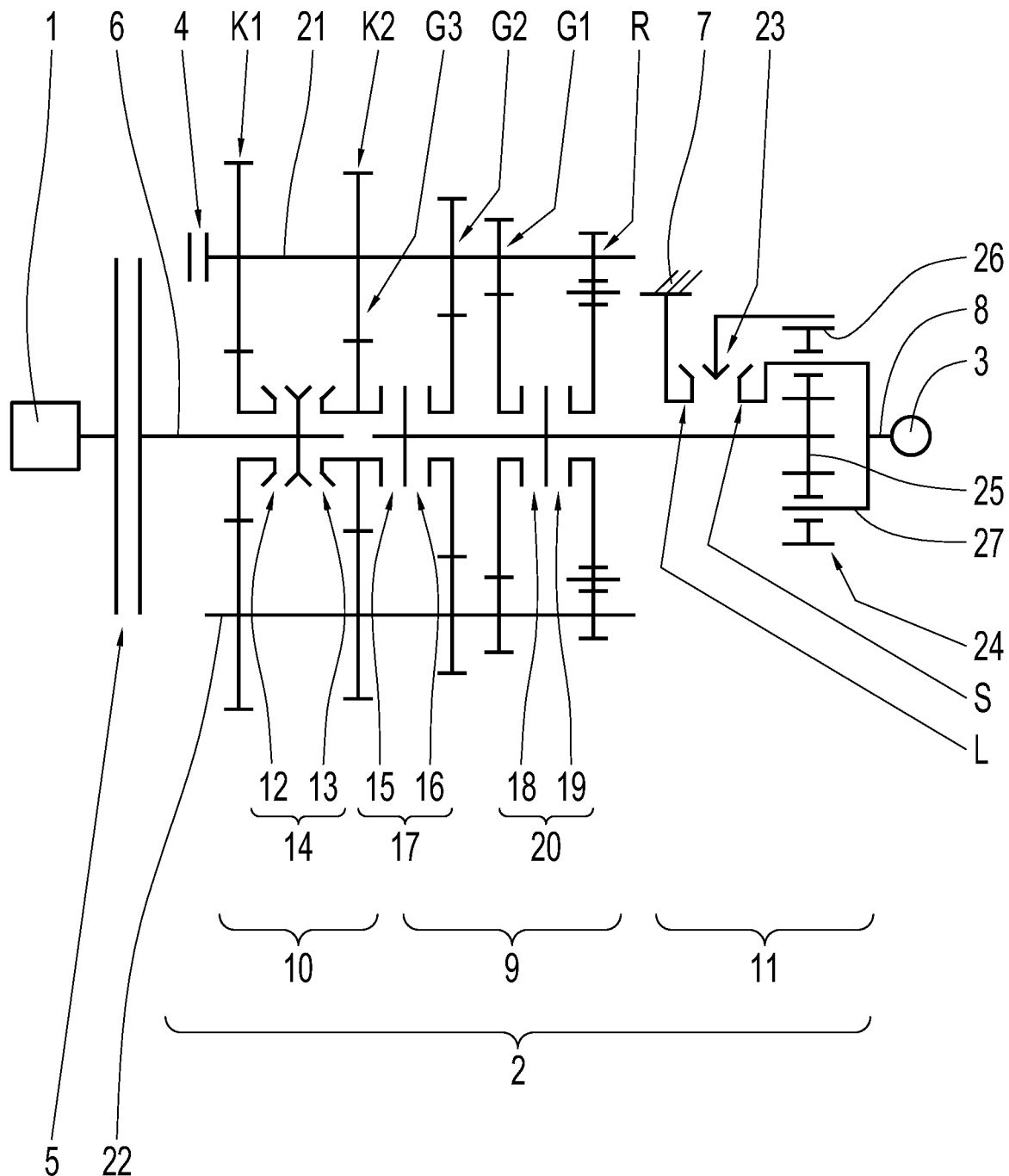
FIG. 1: An example of a diagram of a drive train of a motor vehicle.

FIG. 1 shows a diagram of a drive train of a motor vehicle, comprising a drive aggregate 1, with a group transmission 2, and with a drive output 3.

The drive aggregate 1 can be coupled to an input shaft 6 of the group transmission 2 by means of a separating clutch 5, also called the starting clutch. The drive output 3 is coupled to an output shaft 8 of the group transmission 2.

In the example embodiment shown, the group transmission 2 comprises a main transmission 9, a splitter group 10 drivingly connected upstream from the main transmission 9, and a range group 11 drivingly connected downstream from the main transmission 9. Apart from the main transmission 9 there may only be the range group 11 or only the splitter group 10. The main transmission 9 is also called the main group.

The main transmission 9 of the group transmission 2 is configured as a direct-gear transmission of countershaft design and has two countershafts 21 and 22.

In the example embodiment shown, the main transmission 9 comprises three gears G1, G2, and G3 for forward driving and one gear R for reversing. Loose wheels of the gears G1, G2, and R are each mounted rotatably on a main shaft and can be engaged by means of associated shifting elements 15, 16, 18, and 19 in the form of claw clutches. The associated fixed wheels are arranged rotationally fixed on the countershafts 21, 22. The two shifting elements 15 and 16 and the two shifting elements 18 and 19 form in each case a shifting packet 17 and 20, respectively. The main transmission 9 can be shifted in a synchronized manner.

In the example embodiment shown, the splitter group 10 of the group transmission 2 is made with two gears and is also of countershaft configuration, such that the two gear ratios K1 and K2 of the splitter group 10 form two input constants of the main transmission 9 that can be engaged. The two gear ratios K1 and K2 have a small ratio difference.

The loose wheel of the first gear ratio K1 is mounted rotatably on the input shaft 6. The loose wheel of the second gear ratio K2 is mounted rotatably on the main shaft. The fixed wheels of the two gear ratios K1, K2 of the splitter group 10 are respectively arranged rotationally fixed on the countershafts 21, 22 of the main transmission 9, which are extended on the input-side. Shifting elements 12, 13 of synchronized design, so-termed synchronous shifting elements of the splitter group 10, are combined in a shared shifting packet 14.

The range group 11 of the group transmission 2 connected downstream from the main transmission 9 also has two gears, but in the form of a planetary gearset 24. The sun gear 25 is connected rotationally fixed to the main shaft of the main transmission 9 extended on the output side. The planetary carrier 27 is connected rotationally fixed to the output shaft 8 of the group transmission 2. The ring gear 26 is connected to a shifting packet 23 with two synchronized shifting clutches, by means of which the range group 11 can be shifted alternatively, either to a slow-driving stage L by connecting the ring gear 26 to a positionally fixed housing component 7, or to a fast-driving stage S by connecting the ring gear 26 to the planetary carrier 27. The range group 11 can be shifted in a synchronized manner.

FIG. 1 also shows a transmission brake 4 which engages with the countershaft 21. By means of this transmission brake 4 the countershaft 21 can be braked.

At this time it should be pointed out that although the design of the group transmission 2 shown in FIG. 1 is preferred, it is optional. The invention can also be used in combination with other group transmissions.

Thus, the group transmission 2 can comprise only the main transmission 9 and the range group 11, or even only the main transmission 9 and the splitter group 10. It is also possible that in the area of the splitter group 10 and/or in the area of the range group 11 claw-type shifting elements are used.

Figure 2:
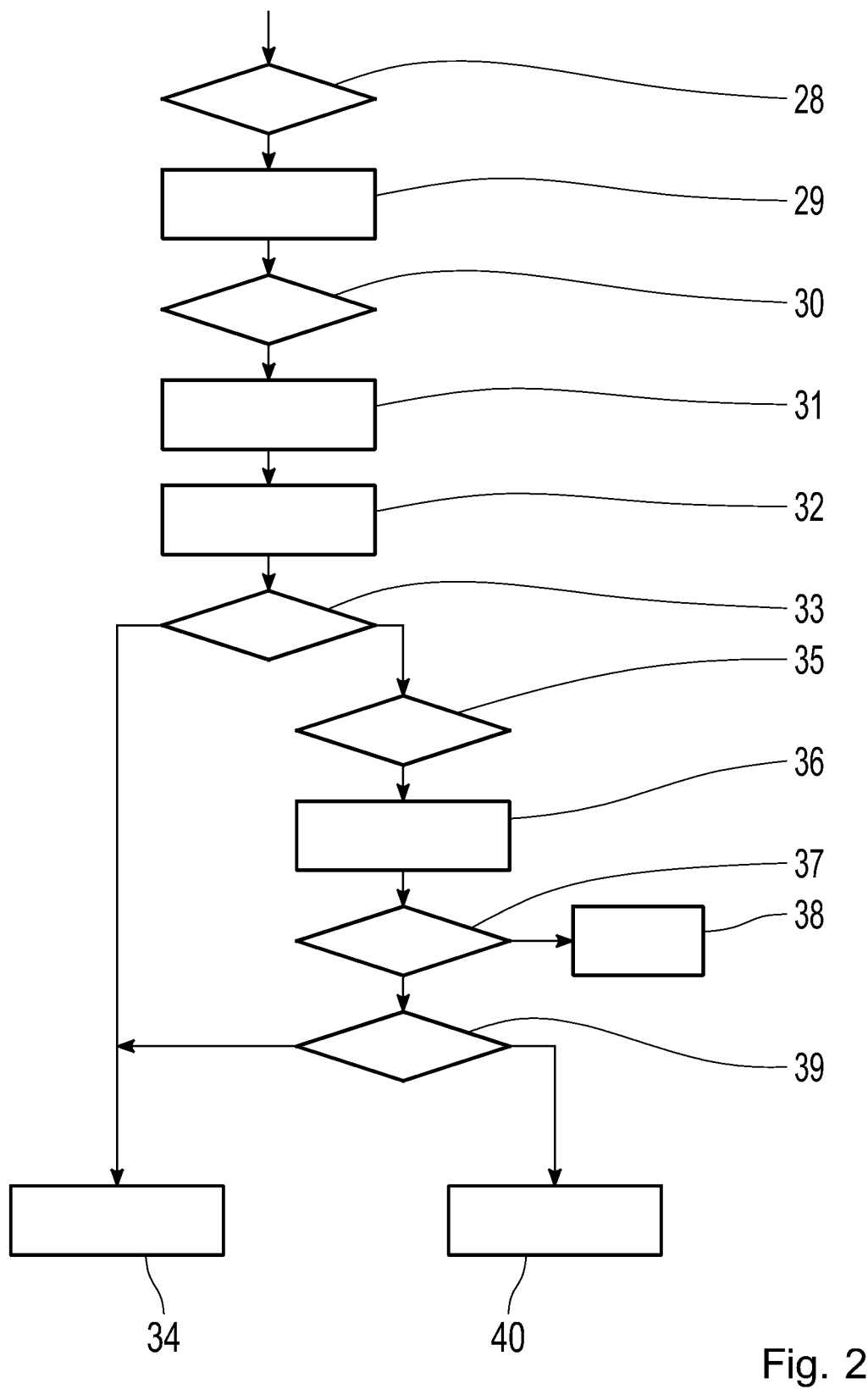
FIG. 2: A signal flow-chart to clarify the invention.

The invention now relates to a method for operating a drive train with a group transmission 2, starting from a condition in which, if the speed of the motor vehicle is lower than a limit value, the separating clutch 5 is opened and for transmission preselection a sub-transmission of the group transmission 2 is changed to neutral or in the direction toward neutral while the other, or every other sub-transmission is changed to a friction-force-locking state or in the direction of a friction-force-locking state, in order to change the group transmission 2 to a friction-force-locking condition quickly. In the group transmission 2 of FIG. 1 the sub-transmission of the group transmission 2, which is changed to neutral for the transmission preselection, is preferably the main transmission 9. For the transmission preselection, the splitter group 10 and the range group 11 are changed to a friction-force-locking condition, or in the direction toward a friction-force-locking condition, so they are engaged, or they are in a tooth-on-tooth position. Starting from such a condition, it should be possible to change the group transmission 2, i.e., whichever sub-transmission is still in neutral, to a friction-force-locking condition in a short time. The method according to the invention will be described below with reference to the signal flow-chart of FIG. 2.

In a block 28 it is checked whether a speed of the motor vehicle is lower than a limit value. If so, then starting from block 28 the process advances to bock 29, and in block 29 the separating clutch 5 is opened and for the transmission preselection of the group transmission 2 a sub-transmission thereof is changed to neutral or in a direction toward neutral, whereas the other, or every other sub-transmission is changed to a friction-force-locking condition or in the direction toward a friction-force-locking condition. In block 30 it is checked whether the respective sub-transmission that is to be changed to neutral is in neutral, and whether the other, or every other sub-transmission has been changed to a friction-force-locking condition or in the direction toward a friction-force-locking condition. This can be checked with the help of path sensors that co-operate with shifting elements.

If in block 30 it is found that the transmission preselection has been completed, then after this, in a block 31, the separating clutch 5 is at least partially closed and in a block 32 the drive aggregate 1 is brought to a defined rotation speed which, for example, can correspond to the idling rotation speed of the drive aggregate 1 or can be higher than the idling rotation speed of the drive aggregate 1 by a defined offset.

Thereafter, in a block 33 it is checked whether, if a friction-force-locking group transmission 2 is required, a starting gear shift or a gearshift wished for by the driver has been called for, in order to change the not yet friction-force-locking group transmission 2 to a friction-force-locking condition.

In this case, in block 33 it is checked whether a current speed of the motor vehicle is lower than a second limit value. If the speed of the motor vehicle is lower than the second limit value, then it is concluded that a starting shift is called for, whereupon the process branches off to block 34.

On the other hand, if in block 33 it is found that the speed of the motor vehicle is higher than a second limit value, then starting from block 33 the system branches off to block 35, and in block 35 an accelerator pedal actuation by the driver and/or a brake pedal actuation by the driver is checked. If, after the check in block 33 the current speed of the motor vehicle is found to be higher than the second limit value and if the check in block 35 reveals that a brake pedal is not actuated or is no longer actuated by the driver, and/or an accelerator pedal is being actuated, then a shift desired by the driver is being called for and the process advances to block 36.

In block 36, for a shift desired by the driver, depending on the operating conditions of the motor vehicle at the time, a target gear for the group transmission 2 is set and depending on the target gear, the target rotation speed of the drive aggregate 1 is determined.

As the current operating conditions of the motor vehicle, as a function of which the target gear of the group transmission 2 is determined, a current road inclination and/or a current vehicle mass can be taken into account.

After the target gear for the driver-desired shift and the target rotation speed of the drive aggregate 1 have been determined, in a block 37 it is checked whether the transmission preselection in block 29 is appropriate for the target gear determined in block 36.

If it is found that the transmission preselection is not appropriate for the target gear, then starting from block 37 the process branches off to bock 38 and the process is discontinued. On the other hand, if it is found that the transmission preselection is appropriate for the target gear of the driver-desired shift required, then staring from block 37 the process branches off to block 39 and the process is continued.

In block 39 it is checked whether, if a shift desired by the driver with a target gear appropriate for the transmission preselection is called for, the target rotation speed of the drive aggregate is higher or lower than the current transmission input rotation speed at the input shaft 6 of the group transmission 2.

If in block 39 it is found that the target rotation speed of the drive aggregate 1 is lower than the current transmission input rotation speed, then starting from block 39 the process branches to block 34.

On the other hand, if in block 39 it is found that the target rotation speed of the drive aggregate 1 is higher than the current transmission input rotation speed, then starting from block 39 the process branches off to block 40.

In block 34, to carry out the gearshift required the separating clutch 5 is opened and the sub-transmission of the group transmission 2 that is in neutral, which is to be changed to a friction-force-locking condition, is synchronized by means of the transmission brake 4 and after this synchronization the sub-transmission is changed to a friction-force-locking condition.

To carry out a required gearshift in block 40, the separating clutch 5 remains at least partially closed and the sub-transmission in neutral is synchronized by the drive aggregate 1 in that a defined rotation speed is set at the drive aggregate 1, such that after this synchronization by the drive aggregate 1 the now synchronized sub-transmission can be changed from neutral to the friction-force-locking condition.

With the method according to the invention, starting from a non-friction-force-locking condition in which a sub-transmission of the group transmission 2 is in neutral and the other, or every other sub-transmission is changed to a friction-force-locking condition, a group transmission 2 can be changed to a friction-force-locking condition within a short time so that then a drive torque can be transmitted by the group transmission 2 in the direction toward the drive output 3.

The invention also relates to a control unit for carrying out the above-described method, which unit is designed to carry out the above-described method automatically.

The control unit is preferably an electrical or electronic transmission control unit comprising hardware and software means. The hardware means include data interfaces for the exchange of data with the assemblies involved in carrying out the method according to the invention. In addition, the hardware means include a processor for data processing and a memory for data storage. The software means include program modules implemented in the control unit for carrying out the method according to the invention.

If a speed of the motor vehicle is lower than a limit value, then the control unit actuates the separating clutch 5 to open it and the control unit also actuates the group transmission for transmission preselection in such manner that one of the sub-transmissions of the group transmission 2 is activated to be changed to neutral and the other, or every other sub-transmission is changed to a friction-force-locking condition.

Thereafter, the control unit actuates the separating clutch 5 to at least partially close it, and the drive aggregate 1 to operate at a defined rotation speed, wherein the drive aggregate 1 is controlled either directly, or indirectly by way of a further control unit.

After that, the control unit checks whether, w % ben a friction-force-locking group transmission is required, a starting shift or a driver-desired shift for the group transmission 2 is called for in order to change the group transmission 2 to a friction-force-locking condition, i.e., in order to engage a gear in the sub-transmission which was previously in neutral.

When a driver-desired shift is to be carried out, the control unit checks whether a target rotation speed of the drive aggregate 1 for the driver-desired shift is higher or lower than the current input rotation speed of the group transmission 2.

If a starting shift is required, and if, when a driver-desired shift is called for, the target rotation speed of the drive aggregate 1 is lower than the current input rotation speed of the group transmission 2, the control unit actuates the separating clutch 5 to open and the transmission brake 4 to synchronize the sub-transmission that is in neutral, and after synchronizing the sub-transmission by means of the transmission brake 4 the control unit actuates it so as to change it to a friction-force-locking condition. If, when a driver-desired shift is called for, the target rotation speed of the drive aggregate 1 is higher than the current input rotation speed of the group transmission 2, the sub-transmission still in neutral is synchronized by the drive aggregate 1 and after that the control unit actuates this synchronized sub-transmission to change it to a friction-force-locking condition.

INDEXES

1 Drive aggregate
2 Group transmission
3 Drive output
4 Transmission brake
5 Separating clutch
6 Input shaft
7 Housing component
8 Output shaft
9 Main transmission
10 Splitter group
11 Range group
12 Synchronous shifting element
13 Synchronous shifting element
14 Shifting packet
15 Shifting element
16 Shifting element
17 Shifting packet
18 Shifting element
19 Shifting element
20 Shifting packet
21 Countershaft
22 Countershaft
23 Shifting packet
24 Planetary gearset
25 Sun gear
26 Ring gear
27 Planetary carrier
28 Block
29 Block
30 Block
31 Block
32 Block
33 Block
34 Block
35 Block
36 Block
37 Block
38 Block
39 Block
40 Block

The invention claimed is:

1. A method for operating a drive-train of a motor vehicle, the method comprising:
providing a drive train comprising a drive aggregate, a drive output, a group transmission connected between the drive aggregate and the drive output, and a separating cutch connected between the drive aggregate and the group transmission, wherein the group transmission comprises a plurality of sub-transmissions that include (i) at least one main transmission and a splitter group drivingly connected upstream from the main transmission and/or (ii) a range group drivingly connected downstream from the main transmission;
determining that a speed of the motor vehicle is lower than a limit value;
opening the separating clutch;
pre-selecting the transmission by changing one of plurality of sub-transmissions to neutral and changing at least one other of the plurality of sub-transmissions to a friction-force-locking condition;
subsequently at least partially closing the separating clutch and bringing the drive aggregate to a pre-defined rotation speed;
determining whether a friction-force-locking group transmission is required;
checking whether a starting shift or a driver-desired shift for the group transmission is called for; and
determining a target rotation speed of the drive aggregate.

2. The method of claim 1, comprising:
determining that the driver-desired shift is called for; and
determining whether the target rotation speed of the drive aggregate is higher or lower than the current input rotation speed of the group transmission.

3. The method of claim 2, comprising:
determining that the starting shift is required;
determining that the target rotation speed of the drive aggregate is lower than the current input rotation speed of the group transmission;
opening the separating clutch;
synchronizing, by use of a transmission brake, the one of the plurality of sub-transmissions in neutral; and
changing, after synchronizing, the one of the plurality of sub-transmissions is changed to a friction-force-locking condition.

4. The method of claim 2, comprising:
determining that the target rotation speed of the drive aggregate is higher than the current input rotation speed of the group transmission;

synchronizing, by the drive aggregate, the one of the plurality of sub-transmissions in neutral; and changing, after synchronizing, the one of the plurality of sub-transmissions that was in neutral to a friction-force-locking condition.

5. The method according to claim 3, comprising:
determining that the friction-force-locking group transmission is required; and
wherein determining that a starting shift is called for includes determining that a current speed of the motor vehicle is lower than a second limit value.

6. The method according to claim 1, comprising:
determining that the friction-force-locking group transmission is required; and
determining that the driver-desired shift in the group transmission is called for includes:
determining that a speed of the motor vehicle is higher than the second limit value; and
determining that the brake pedal is not actuated by the driver and/or that an accelerator pedal is actuated by the driver.

7. The method according to claim 1, comprising:
determining that the driver-desired shift is called for;
determining the target gear for the group transmission based on a current operating condition of the motor vehicle; and
determining the target rotation speed of the drive aggregate as a function of the target gear is determined.

8. The method according to claim 7, wherein:
determining the target gear for the group transmission is performed as a function of a current road inclination and/or as a function of a current vehicle mass.

9. The method according to claim 7, comprising:
checking, subsequent to determining the target gear, whether the transmission preselection is appropriate for the target gear;
determining that the transmission preselection is not appropriate for the target gear; and
discontinuing the process.

10. A control unit configured for operating a drive-train of a motor vehicle, the drive train comprising a drive aggregate, a drive output, a group transmission connected between the drive aggregate and the drive output, and a separating cutch connected between the drive aggregate and the group transmission, wherein the group transmission comprises a plurality of sub-transmissions that include (i) at least one main transmission and a splitter group drivingly connected upstream from the main transmission and/or (ii) a range group drivingly connected downstream from the main transmission;
wherein the control unit is configured to:
determine that a speed of the motor vehicle is lower than a limit value;
open the separating clutch;
pre-select the transmission by changing one of plurality of sub-transmissions to neutral and change at least one other of the plurality of sub-transmissions to a friction-force-locking condition;
at least partially close the separating clutch after pre-selecting the transmission and bring the drive aggregate to a pre-defined rotation speed;
determine whether a friction-force-locking group transmission is required;
check whether a starting shift or a driver-desired shift for the group transmission is called for; and
determine a target rotation speed of the drive aggregate.

11. The control unit according to claim 10, wherein the control unit is configured to:

determine that the driver-desired shift is called for; and
determine whether the target rotation speed of the drive aggregate is higher or lower than the current input rotation speed of the group transmission.

12. The control unit according to claim 11, wherein the control unit is configured to:
determine that the starting shift is required;
determine that the target rotation speed of the drive aggregate is lower than the current input rotation speed of the group transmission;
open the separating clutch;
synchronize the one of the plurality of sub-transmissions in neutral; and
change the one of the plurality of sub-transmissions is changed to a friction-force-locking condition.

13. The control unit according to claim 11, wherein the control unit is configured to:
determine that the target rotation speed of the drive aggregate is higher than the current input rotation speed of the group transmission;
synchronize the one of the plurality of sub-transmissions in neutral; and
change, after synchronizing, the one of the plurality of sub-transmissions that was in neutral to a friction-force-locking condition.

14. The control unit according to claim 12, wherein the control unit is configured to:
determine that the friction-force-locking group transmission is required; and
wherein determining that a starting shift is called for includes determining that a current speed of the motor vehicle is lower than a second limit value.

15. The control unit according to claim 12, wherein the control unit is configured to:
determine that the friction-force-locking group transmission is required; and
determining that the driver-desired shift in the group transmission is called for includes:
determining that a speed of the motor vehicle is higher than the second limit value; and
determining that the brake pedal is not actuated by the driver and/or that an accelerator pedal is actuated by the driver.

16. The control unit according to claim 10, wherein the control unit is configured to:
determining that the driver-desired shift is called for;
determining the target gear for the group transmission based on a current operating condition of the motor vehicle; and
determining the target rotation speed of the drive aggregate as a function of the target gear is determined.

17. The control unit according to claim 16, wherein the control unit is configured to:
determine the target gear for the group transmission as a function of a current road inclination and/or as a function of a current vehicle mass.

18. The control unit according to claim 16, wherein the control unit is configured to:
check, subsequent to determining the target gear, whether the transmission preselection is appropriate for the target gear;
determine that the transmission preselection is not appropriate for the target gear; and
discontinue the process.

* * * * *